United States Patent
Peng et al.

(10) Patent No.: US 11,257,299 B2
(45) Date of Patent: Feb. 22, 2022

(54) FACE MODEL PROCESSING FOR FACIAL EXPRESSION METHOD AND APPARATUS, NON-VOLATILE COMPUTER-READABLE STORAGE-MEDIUM, AND ELECTRONIC DEVICE

(71) Applicant: Tencent Technology (Shenzhen) Company Limited, Shenzhen (CN)

(72) Inventors: Weilong Peng, Shenzhen (CN); Chen Li, Shenzhen (CN); Yuwing Tai, Shenzhen (CN); Xiaoyong Shen, Shenzhen (CN); Jiaya Jia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/898,202

(22) Filed: Jun. 10, 2020

(65) Prior Publication Data

US 2020/0312043 A1 Oct. 1, 2020

Related U.S. Application Data

(63) Continuation of application No. PCT/CN2019/077221, filed on Mar. 6, 2019.

(30) Foreign Application Priority Data

Apr. 18, 2018 (CN) .......................... 201810349627.6

(51) Int. Cl.
*G06T 19/20* (2011.01)
*G06T 7/90* (2017.01)
(Continued)

(52) U.S. Cl.
CPC .......... *G06T 19/20* (2013.01); *G06K 9/00228* (2013.01); *G06K 9/00268* (2013.01);
(Continued)

(58) Field of Classification Search
None
See application file for complete search history.

(56) References Cited

U.S. PATENT DOCUMENTS

2012/0224019 A1* 9/2012 Samadani ................ H04N 9/09
 348/14.01
2012/0314030 A1* 12/2012 Datta ........................ G06T 3/40
 348/44

(Continued)

FOREIGN PATENT DOCUMENTS

CN 1889129 A 1/2007
CN 1920886 A 2/2007
(Continued)

OTHER PUBLICATIONS

Marras, Ioannis, et al. "A virtual system for cavity preparation in endodontics." Journal of dental education 72.4 (2008): 494-502.*

(Continued)

*Primary Examiner* — Tapas Mazumder
(74) *Attorney, Agent, or Firm* — Morgan, Lewis & Bockius LLP

(57) ABSTRACT

Embodiments of the present disclosure disclose a face model processing method performed at an electronic device. The method includes the following steps: obtaining a three-dimensional face model corresponding to a user picture, and selecting a sample oral cavity model in an oral cavity model library for the three-dimensional face model; registering the sample oral cavity model into the three-dimensional face model by using an oral cavity position parameter in the three-dimensional face model; performing form adjustment (Continued)

on an oral cavity form of the registered sample oral cavity model by using an expression parameter of the three-dimensional face model to generate a target oral cavity model; and generating, based on the three-dimensional face model and the target oral cavity model, a three-dimensional face expression model corresponding to the user picture.

20 Claims, 12 Drawing Sheets

(51) Int. Cl.
G06K 9/00 (2022.01)
G06T 17/00 (2006.01)
(52) U.S. Cl.
CPC .............. G06T 7/90 (2017.01); G06T 17/00 (2013.01); *G06T 2207/10024* (2013.01); *G06T 2219/2004* (2013.01); *G06T 2219/2012* (2013.01); *G06T 2219/2016* (2013.01)

(56) References Cited

U.S. PATENT DOCUMENTS

| | | | |
|---|---|---|---|
| 2014/0139522 A1 | 5/2014 | Hwang et al. | |
| 2015/0279113 A1* | 10/2015 | Knorr | G06T 15/50 345/633 |
| 2017/0132828 A1* | 5/2017 | Zelenin | A63F 13/45 |

FOREIGN PATENT DOCUMENTS

| | | |
|---|---|---|
| CN | 101324961 A | 12/2008 |
| CN | 102426712 A | 4/2012 |
| CN | 104318615 A | 1/2015 |
| CN | 105719326 A | 6/2016 |
| CN | 106327571 A | 1/2017 |
| CN | 106652015 A | 5/2017 |
| CN | 107316020 A | 11/2017 |
| CN | 107610209 A | 1/2018 |
| CN | 107657664 A | 2/2018 |
| CN | 108537881 A | 9/2018 |

OTHER PUBLICATIONS

Jun, Yu, et al. "Real-Time 3-D Facial Animation: From Appearance to Internal Articulators." IEEE Transactions on Circuits and Systems for Video Technology 28.4 (2016): 920-932.*

Tencent Technology, WO, PCT/CN2019/077221, Jun. 4, 2019, 5 pgs.

Tencent Technology, IPRP, PCT/CN2019/077221, Oct. 20, 2020, 6 pgs.

Tencent Technology, ISR, PCT/CN2019/077221, Jun. 4, 2019, 3 pgs.

Extended European Search Report, EP19788578.3, dated Nov. 5, 2021, 9 pgs.

\* cited by examiner

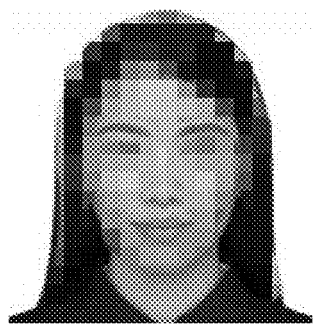

FIG. 7

FIG. 8

| Obtain an identity feature parameter of a face image in the user picture, and obtain coordinate information of the three-dimensional face model based on the identity feature parameter, the identity feature base, and coordinate information of an average face model | S301 |

↓

| Calculate a first area of the coordinate information of the three-dimensional face model projected onto a plane and a second area of the coordinate information of the average face model projected onto the plane, and calculate a first ratio of the first area to the second area | S302 |

↓

| Obtain target coordinate information of the sample oral cavity model in the three-dimensional face model based on the first ratio, the rotation angle, the translation, and the current coordinate information | S303 |

FIG. 9

FACE MODEL PROCESSING FOR FACIAL EXPRESSION METHOD AND APPARATUS, NON-VOLATILE COMPUTER-READABLE STORAGE-MEDIUM, AND ELECTRONIC DEVICE

CROSS REFERENCE TO RELATED APPLICATIONS

This application is a continuation application of PCT Patent Application No. PCT/CN2019/077221, entitled "FACE MODEL PROCESSING METHOD AND DEVICE, NONVOLATILE COMPUTER-READABLE STORAGE MEDIUM AND ELECTRONIC DEVICE" filed on Mar. 6, 2019, which claims priority to Chinese Patent Application No. 201810349627.6, entitled "FACE MODEL PROCESSING METHOD AND DEVICE, AND STORAGE MEDIUM" filed Apr. 18, 2018, all of which are incorporated by reference in their entirety.

FIELD OF THE TECHNOLOGY

This application relates to the field of computer technologies, and in particular, to a face model processing method and apparatus, a non-volatile computer-readable storage medium, and an electronic device.

BACKGROUND OF THE DISCLOSURE

Facial expression synthesis is one type of face synthesis technologies, is applied to the field of computer graphics such as movies, games, human-computer interaction and face recognition, and has a wide application prospect.

However, there often exists partial absence of an oral cavity when the oral cavity is in an opening form in a face picture synthesized by using an existing face synthesis technology. To complement the oral cavity part, a related technical solution mainly uses an oral cavity two-dimensional (2D) synthesis method and an oral cavity 3-dimensional (3D) synthesis method.

The oral cavity 2D synthesis method is first detecting a face region of an original picture and obtaining an oral cavity region through segmentation, then searching a database for an oral cavity picture close to a skin color of the face region, and filling the found oral cavity picture in the oral cavity region. However, generally, it cannot be ensured that the oral cavity picture obtained by using this method is completely consistent with an oral cavity form in the original picture, causing that a picture effect of a fused picture is poor. The oral cavity 3D synthesis method is first detecting feature points of a face in an original picture, then generating a 3D face model corresponding to the face, and next directly fusing a 3D oral cavity model into the 3D face model. However, because a size, lightness, an opening and closing form, and the like of the 3D oral cavity model are difficult to keep consistent with those of the face model, the synthesized image is difficult to achieve a relatively realistic effect in the oral cavity. Therefore, the oral cavity synthesis methods in the related art often cause distortion, and have poor synthesis effects.

SUMMARY

According to various embodiments of this application, a face model processing method and apparatus, a non-volatile computer-readable storage medium, and an electronic device are provided.

A face model processing method, which is executed by an electronic device having a processor and memory storing a plurality of programs to be executed by the processor, and may include:

obtaining a three-dimensional face model corresponding to a user picture, and selecting a sample oral cavity model in an oral cavity model library for the three-dimensional face model;

registering the sample oral cavity model into the three-dimensional face model by using an oral cavity position parameter in the three-dimensional face model;

performing form adjustment on an oral cavity form of the registered sample oral cavity model by using an expression parameter of the three-dimensional face model to generate a target oral cavity model; and generating, based on the three-dimensional face model and the target oral cavity model, a three-dimensional face expression model corresponding to the user picture.

A face model processing apparatus, which may include:

a model obtaining unit, configured to obtain a three-dimensional face model corresponding to a user picture, and obtain a selected sample oral cavity model in an oral cavity model library;

a model registration unit, configured to register the sample oral cavity model into the three-dimensional face model by using an oral cavity position parameter in the three-dimensional face model;

a form adjustment unit, configured to perform form adjustment on an oral cavity form of the registered sample oral cavity model by using an expression parameter of the three-dimensional face model to generate a target oral cavity model; and an expression model generating unit, configured to generate, based on the three-dimensional face model and the target oral cavity model, a three-dimensional face expression model corresponding to the user picture.

A non-transitory computer-readable storage medium, which stores a plurality of instructions, the instructions being configured to be loaded and executed by a processor to perform the foregoing method operations.

An electronic device, which may include a processor and a memory, the memory storing a computer program, the computer program being configured to be loaded and executed by the processor to perform the following operations:

obtaining a three-dimensional face model corresponding to a user picture, and selecting a sample oral cavity model in an oral cavity model library for the three-dimensional face model;

registering the sample oral cavity model into the three-dimensional face model by using an oral cavity position parameter in the three-dimensional face model;

performing form adjustment on an oral cavity form of the registered sample oral cavity model by using an expression parameter of the three-dimensional face model to generate a target oral cavity model; and generating, based on the three-dimensional face model and the target oral cavity model, a three-dimensional face expression model corresponding to the user picture.

Details of one or more embodiments of this application are provided in the accompany drawings and description below. Other features and advantages of this application become more obvious from the specification, the accompanying drawings, and the claims.

BRIEF DESCRIPTION OF THE DRAWINGS

To describe the technical solutions in the embodiments of this application or in the related art more clearly, the following briefly describes the accompanying drawings required for describing the embodiments or the related art. Apparently, the accompanying drawings in the following description show merely some embodiments of this application, and a person of ordinary skill in the art may still derive other drawings from the accompanying drawings without creative efforts.

FIG. 7 is a schematic diagram of an interface of a user picture according to an embodiment of this application.

FIG. 8 is a schematic diagram of an interface of a three-dimensional face model according to an embodiment of this application.

FIG. 9 is a schematic flowchart of a face model processing method according to an embodiment of this application.

DESCRIPTION OF EMBODIMENTS

The following clearly and completely describes the technical solutions in the embodiments of this application with reference to the accompanying drawings in the embodiments of this application. Apparently, the described embodiments are some of the embodiments of this application rather than all of the embodiments. Based on the embodiments of this application, all other embodiments obtained by a person skilled in the art without paying any creative efforts all fall within the protection scope of the application.

Figure 1A:
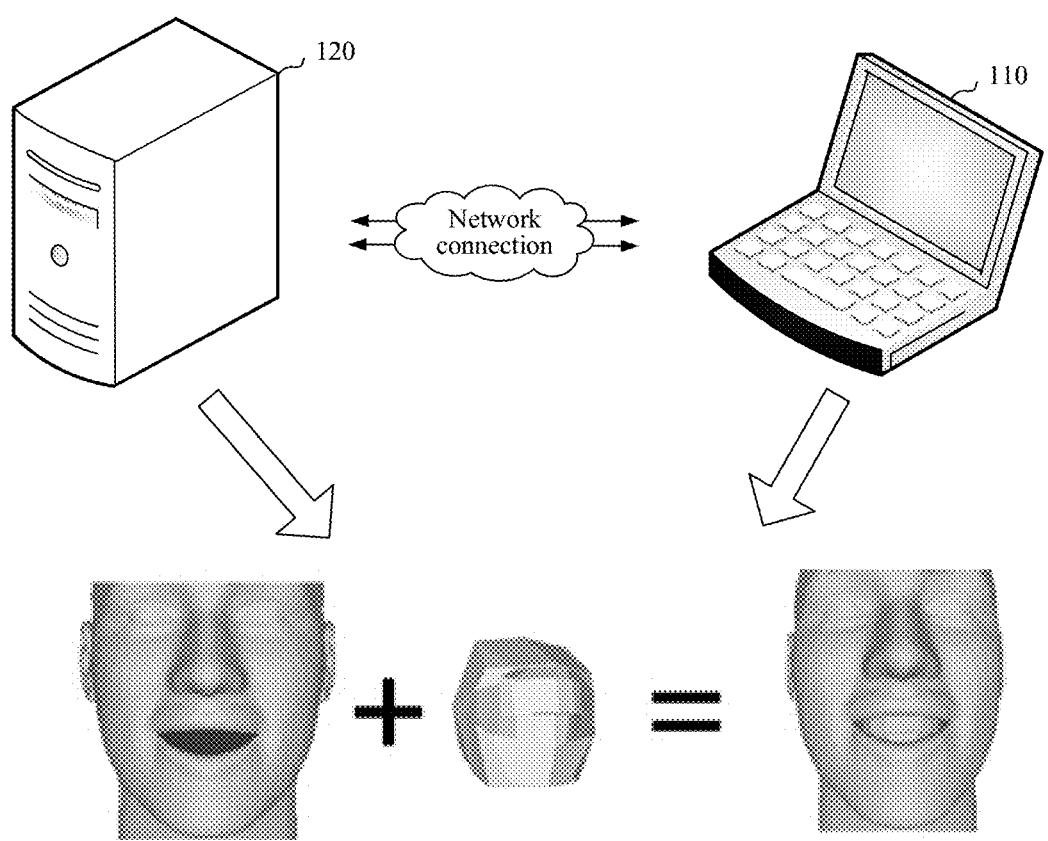
FIG. 1a is an application scenario diagram of a face model processing method according to an embodiment of this application.
Figure 1B:
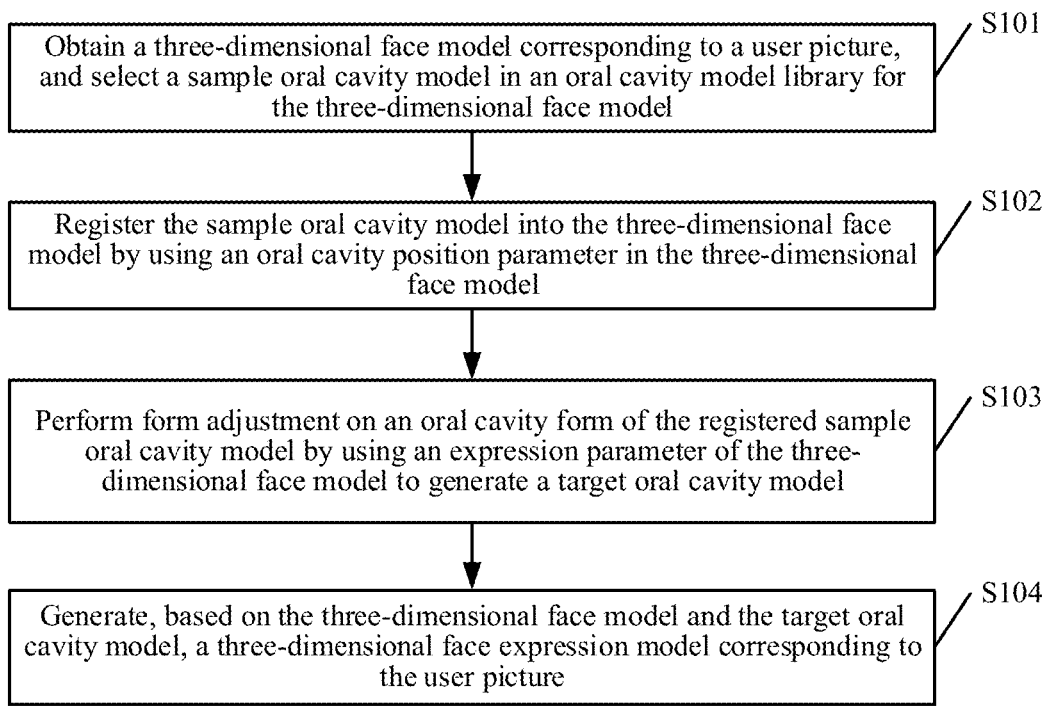
FIG. 1b is a schematic flowchart of a face model processing method according to an embodiment of this application.

FIG. 1a is a diagram of an application environment of a face model processing method in an embodiment. As shown in FIG. 1a, a user terminal 110 is connected to a server 120 through a network. The face model processing method may be implemented by the terminal 110, or may be implemented by the server 120, or may be collaboratively implemented by the terminal 110 and the server 120. The terminal 110 may specifically include terminal devices having an image processing function and an interaction function, such as a tablet computer, a personal computer (PC), a smartphone, a palmtop computer, and a mobile Internet device (MID). The server 120 may be a server having an image processing function, and may be implemented by using an independent server or a server cluster formed by a plurality of servers.

The following describes the face model processing method provided in the embodiments of this application in detail with reference to FIG. 1b to FIG. 14.

FIG. 1 is a schematic flowchart of a face model processing method according to an embodiment of this application. As shown in FIG. 1, the method in this embodiment of this application may include the following S101 to S104.

S101. Obtain a three-dimensional face model corresponding to a user picture, and select a sample oral cavity model in an oral cavity model library for the three-dimensional face model.

It may be understood that, the user picture is a picture that is selected by a user and that is used for establishing a three-dimensional face model, may be a picture selected in a picture library, or may be a picture currently shot by a camera. The camera may be a fixed camera, or may be a rotatable camera. The user picture includes a face image. There may be one or more face images. Certainly, the user picture may alternatively be a face-like picture, such as a picture in a form of sketch, ink and wash painting, animation, architecture, sculpture, artwork, or the like.

The obtaining a three-dimensional face model corresponding to a user picture may be understood as that the electronic device obtains a selected user picture, performs face recognition processing on the user picture to obtain the face image in the user picture, obtains a three-dimensional expression model in an expression model library, and synthesizes the face image with the three-dimensional expression model to generate the three-dimensional face model corresponding to the user picture. The electronic device may be the user terminal 110 in FIG. 1, including terminal devices having an image processing function and an interaction function such as a tablet computer, a PC, a smartphone, a palmtop computer, and an MID. In this case, the obtained user picture is read and obtained by the electronic device after being selected by the user through the electronic device. The electronic device may alternatively be the server 120 having an image processing function in FIG. 1. In this case, the obtained user picture is transmitted to the electronic device by the user terminal after the user inputs a request through the electronic device and is read and obtained by the electronic device.

The face recognition processing may be performing face detection on the user picture. When the face image is detected, the electronic device may mark the detected face image, perform facial feature positioning or the like. The face detection may be specifically performed according to actual scenario requirements. The face detection process may be implemented by using face recognition methods, such as a face recognition method based on feature face principal component analysis, a face recognition method of elastic graph matching, a face recognition method of a support vector machine, and a face recognition method of a deep neural network.

The obtaining a three-dimensional expression model in an expression model library may be randomly selecting a three-dimensional expression model from an expression model set updated based on a current event (such as a current date, a hotspot event occurring on a current date, or a favorite theme selected by the user); or may be obtaining theme information of the user picture after analyzing the user picture, and searching the expression model library for a three-dimensional expression model matching the theme information. The theme information may be described by using a keyword. For example, the theme information may be "Girl's Day", "red packet", or "happy".

The obtaining a three-dimensional face model corresponding to a user picture may also be understood as performing three-dimensional reconstruction processing on the face image in the user picture by using a three-dimensional reconstruction technology, and replacing an expression parameter of the face model generated through the three-dimensional reconstruction with an expression parameter selected by the user to generate the three-dimensional face model. The three-dimensional reconstruction technology means that under a condition that depth information of a target object is known, three-dimensional reconstruction of the target object may be implemented only through registration and fusion of point cloud data. Currently, the three-dimensional reconstruction technology is classified into a passive three-dimensional reconstruction technology and an active three-dimensional reconstruction technology based on an obtaining method for the depth information of the target object. The passive three-dimensional reconstruction technology generally uses an ambient environment such as reflection of natural light, uses a camera to obtain the image, and then obtains three-dimensional spatial information of the target object by using a specific algorithm, and mainly includes a texture restoration shape method, a shadow restoration shape method and a stereo vision method. The active three-dimensional reconstruction technology means that a light source or an energy source, such as a laser, a sound wave or an electromagnetic wave is transmitted to the target object, and the depth information of the target object is obtained by receiving a returned light wave, and mainly includes a Moire fringe method, a time-of-flight method, a structured light method and a triangulation method.

Figure 2:
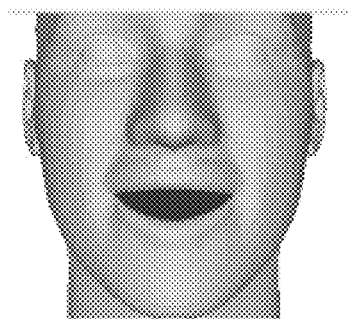
FIG. 2 is a schematic diagram of an interface of a three-dimensional face model according to an embodiment of this application.

The obtained three-dimensional face model may be described by using a formula $S=\bar{S}+\Sigma w_i U_i+\Sigma v_i V_i$ $S=\bar{S}+\Sigma w_i U_i+\Sigma v_i V_i$, where S is a three-dimensional face model, $\bar{S}$ is a three-dimensional model of an average face, $U_i$ and $V_i$ are respectively a spatial basis vector matrix of a face identity and a spatial basis vector matrix of a face expression obtained by training a face three-dimensional model data set, and $w_i$ and $v_i$ represent an identity parameter and an expression parameter of a corresponding three-dimensional human model. $\bar{S}$, $U_i$, and $V_i$ are known numbers. If $w_i$ and $v_i$ are known, a corresponding three-dimensional face model S may be calculated according to the foregoing formula. Correspondingly, if the three-dimensional face model S is synthesized, $w_i$ and $v_i$ corresponding to the three-dimensional face model may also be obtained through detection. Generally, a presentation form of the three-dimensional face model S is changed by changing values of $w_i$ and $v_i$. The identity parameter $w_i$ of the three-dimensional face model remains unchanged to control the change of $v_i$, so that geometric models of the same face with different expressions may be obtained. For example, FIG. 2 shows a generated three-dimensional expression model.

Figure 3:
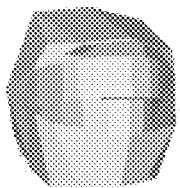
FIG. 3 is a schematic diagram of an interface of a sample oral cavity model according to an embodiment of this application.

The oral cavity model library includes at least one oral cavity model is, and each oral cavity model may be described by a formula $T=\bar{T}+\alpha\Delta T_1+\beta\Delta T_2+\gamma\Delta T_3$ $T=\bar{T}+\alpha\Delta T_1+\beta\Delta T_2+\gamma\Delta T_3$, except that α, β, and γ are of different values. $\bar{T}$ is an oral cavity model in a closed state. $\Delta T_1$, $\Delta T_2$ and $\Delta T_3$ are an oral cavity opening and closing offset, a tongue stretching offset, and a tongue swinging offset respectively. α, β, and γ are an oral cavity opening and closing parameter, a tongue stretching parameter, and a tongue swinging parameter respectively. An oral cavity opening and closing form, a tongue stretching form, and a tongue swinging form may be controlled by changing the values of α, β, and γ respectively. An oral cavity model randomly selected from the oral cavity model library is used as a sample oral cavity model. The sample oral cavity model is shown in FIG. 3.

S102. Register the sample oral cavity model into the three-dimensional face model by using an oral cavity position parameter in the three-dimensional face model.

It may be understood that, the oral cavity position parameter is used for indicating registering the sample oral cavity model into the three-dimensional face model. The registration includes registration of a size and a position of the sample oral cavity model, so that the sample oral cavity model matches the three-dimensional face model.

In a specific implementation, the electronic device obtains an rotation angle and a translation of the sample oral cavity model relative to the three-dimensional face model, and obtains current coordinate information of the sample oral cavity model; obtains target coordinate information of the sample oral cavity model in the three-dimensional face model based on the rotation angle, the translation, the current coordinate information, coordinate information of the three-dimensional face model, and coordinate information of an average face model; and moves the sample oral cavity model to a target position indicated by the target coordinate information. The rotation angle refers to a rotation angle and a rotation direction of the sample oral cavity model relative to the three-dimensional face model in a space (a three-dimensional coordinate system). The rotation direction includes a pitching direction, a horizontal deflection direction, and a spatial rolling direction. The rotation angle may be represented by a rotation matrix. The translation refers to a relative distance between the sample oral cavity model and the three-dimensional face model on a plane (such as projected onto an x or y plane), and may be obtained through calculation based on coordinates of the sample oral cavity model and the three-dimensional face model. The average face model may refer to extracting facial features from a certain quantity of common faces, and averaging according to measurement data, and is obtained through synthesis according to the averaged value.

Figure 4:
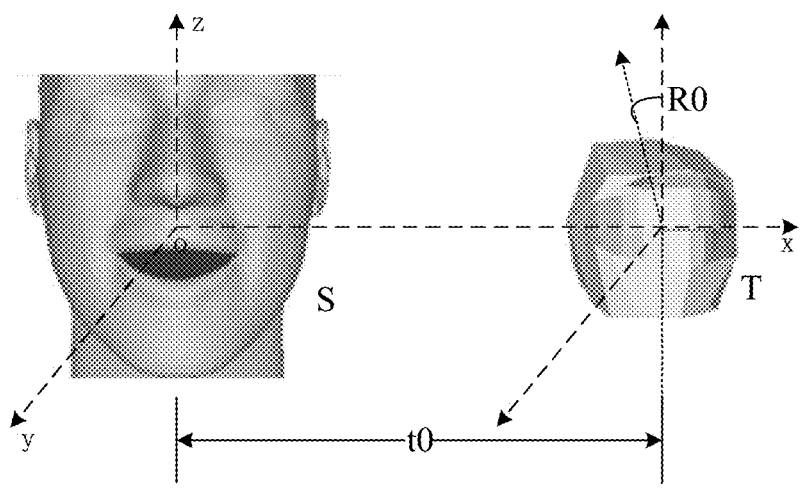
FIG. 4 is a schematic diagram of displaying a model in a coordinate system according to an embodiment of this application.

The obtaining an rotation angle and a translation of the sample oral cavity model relative to the three-dimensional face model may be understood as obtaining a rotation matrix R1 and a coordinate t1 of the sample oral cavity model in the same coordinate system, and obtaining a rotation matrix R2 and a coordinate t2 of the three-dimensional face model. In this case, the rotation angle R of the sample oral cavity model relative to the three-dimensional face model may be obtained through calculation based on R1 and R2, and the translation t may be obtained through calculation based on t1 and t2. Certainly, one of the sample oral cavity model and the three-dimensional face model in the same coordinate system may alternatively be used as a reference model, and only the rotation angle R and the translation t of another model relative to the reference model need to be calculated. For example, as shown in FIG. 4, a three-dimensional face model S and a sample oral cavity model T are included. In the same coordinate system xyz, if S is used as a reference model, a rotation matrix of S relative to the coordinate system is R1, and a rotation matrix of T relative to the coordinate system is R2. In this case, an rotation angle R=R1/R2. Correspondingly, a translation of T relative to S is t=t0. It may be further understood that, the three-dimensional expression model stored in the expression model library and the oral cavity model stored in the oral cavity model library are frontally disposed (without angle deflection), and the generated three-dimensional face model correspondingly rotates based on rotation of the face image in the user picture. In this case, only the user picture needs to be analyzed to obtain a rotation matrix of the face image. The rotation matrix is an rotation angle R of the sample oral cavity model relative to the three-dimensional face model. The translation t of the sample oral cavity model relative to the three-dimensional face model may still be obtained through calculation based on a position difference, or may be obtained by calculating a coordinate difference on the plane based on the coordinate information of the three-dimensional face model and the coordinate information of the sample oral cavity model.

In addition, because the size of the obtained sample oral cavity model does not necessarily completely match a size of the three-dimensional face model, the size of the sample oral cavity model needs to be adjusted according to the size of the three-dimensional face model (for example, the size of the sample oral cavity model is adjusted according to a projection area of the three-dimensional face model projected onto the x or y plane). A specific manner may be: obtaining an identity feature parameter $w_i$ of the face image in the user picture by analyzing the user picture, and obtaining the coordinate information of the three-dimensional face model based on the identity feature parameter $w_i$, an identity feature base $U_i$, and the coordinate information of the average face model $\overline{S}$; calculating a first area Area($\pi$(S)) of the coordinate information S of the three-dimensional face model projected onto a plane (for example, the x or y plane) and a second area Area($\pi(\overline{S})$)Area($\pi(\overline{S})$) of the coordinate information $\overline{S}$ of the average face model projected onto the plane, and calculating a first ratio $$\frac{\text{Area}(\pi(S))}{\text{Area}(\pi(\overline{S}))}$$

of the first area to the second area; and adjusting the size of the sample oral cavity model based on the first ratio, so that it can be ensured that the size of the oral cavity model changes along with the size of the three-dimensional face model.

Figure 5:
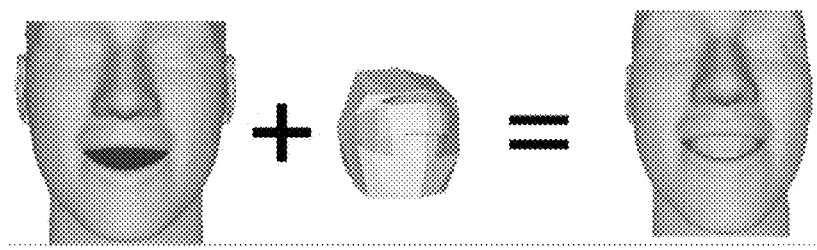
FIG. 5 is a schematic diagram of an effect obtained after a sample oral cavity model is registered according to an embodiment of this application.

During specific implementation, the obtained rotation angle R, the current coordinate information T of the sample oral cavity model, the translation t, and the first ratio are substituted into a formula $$T^* = \frac{\text{Area}(\pi(S))}{\text{Area}(\pi(\overline{S}))} \cdot R \cdot T + t$$

$$T^* = \frac{\text{Area}(\pi(S))}{\text{Area}(\pi(\overline{S}))} \cdot R \cdot T + t,$$

to obtain coordinate information T* of the sample oral cavity model after the adjustment of the size and the position. The transformation process from T to T* implements the fusion of the sample oral cavity model and the three-dimensional face model. FIG. 5 shows an effect drawing after the fusion of S and T. The described coordinate information is the three-dimensional coordinate information.

S103. Perform form adjustment on an oral cavity form of the registered sample oral cavity model by using the expression parameter of the three-dimensional face model to generate a target oral cavity model.

It may be understood that, because the three-dimensional face model and the sample oral cavity model have respective action mechanisms when the expression changes, and are independent of each other, it is difficult to ensure that the oral cavity form of the sample oral cavity model matches the form of the three-dimensional face model. To ensure coordination between the sample oral cavity model and the three-dimensional face model, the oral cavity form of the sample oral cavity model needs to be adjusted.

The oral cavity form includes an oral cavity opening and closing form, a tongue stretching form, and a tongue swinging form, which are controlled by values of an oral cavity opening and closing parameter $\alpha$, a tongue stretching parameter $\beta$, and a tongue swinging parameter $\gamma$ respectively.

The oral cavity opening and closing parameter $\alpha$ is obtained based on an expression parameter v and a linkage weight $\eta$ of the three-dimensional face model. A specific implementation is as follows: obtaining a plurality of expression component parameters $v_i$ corresponding to the expression parameter v, separately calculating products of the expression component parameters $v_i$ in the plurality of expression component parameters and corresponding linkage weights $\eta_i$, and then performing linear weighting processing on the products to obtain an opening and closing parameter $\alpha = \Sigma_{i \in G} \eta_i \cdot v_i \alpha = \Sigma_{i \in G} \eta_i \cdot v_i$ of the oral cavity model, where G is a set of indexes i of the expression parameter $v_i$ related to oral cavity opening and closing actions in a formula $S = \overline{S} + \Sigma w_i U_i + \Sigma v_i V_i$ $S = \overline{S} + \Sigma w_i U_i + \Sigma v_i V_i$. A value of $\eta_i$ is set by manually adjusting the oral cavity model and the three-dimensional face model, a parameter sample pair $<\alpha,v>$ is obtained when actions of the oral cavity model and the three-dimensional face model are coordinated, and then a statistical value of $\eta$ is calculated by using a least square method to serve as an optimal prior parameter $\eta_i$. A quantity of parameter sample pairs is preferably greater than or equal to twice a quantity of G, so as to improve accuracy of calculation. The least square method (also referred to as method of the least squares) is a mathematical optimization technology. The mathematical optimization technology searches for a best function matching the data by minimizing a sum of squares of errors. The least square method may be used to easily obtain the unknown data, and enables the sum of squares of errors between the obtained data and actual data to be minimized.

The tongue stretching parameter β and the tongue swinging parameter γ may be obtained based on the expression parameter $v_i$ in an oral cavity expression parameter set. That is, the expression parameter $v_i$ is in a correspondence with the tongue stretching parameter β and the tongue swinging parameter γ. When the expression parameter is correspondingly stored in a table form, β and γ may be directly obtained by looking up the table. The tongue stretching parameter and the tongue swinging parameter may alternatively be randomly selected from a tongue stretching parameter set and a tongue swinging parameter set updated based on the current event. A predefined oral cavity expression parameter set may alternatively be searched based on the theme information of the user picture for β and γ matching the theme information. The theme information may be described by a keyword. For example, the theme information may be "sad", "laugh", "happy", or the like.

During specific implementation, the electronic device separately adjusts the oral cavity opening and closing parameter α, the tongue stretching parameter β, and the tongue swinging parameter γ of the sample oral cavity model to generate an adjusted sample oral cavity model, namely, the target oral cavity model.

Optionally, when a face skin color lightness value does not match an oral cavity lightness value, the electronic device performs lightness adjustment on an oral cavity lightness value of the sample oral cavity model after the form adjustment by using the face skin color lightness value of the user picture or controlling an illumination direction. A specific manner may be: calculating a scaling factor $s_{tooth\_light}$ of the oral cavity lightness value based on the face skin color lightness value, and using the scaling factor $s_{tooth\_light}$ to scale the oral cavity lightness value according to a corresponding proportion after an oral cavity texture RGB (red, green, blue) space is converted to an HSL (hue, saturation, lightness) space, and finally, then converting the cavity lightness value to the RGB space for display.

S104. Generate, based on the three-dimensional face model and the target oral cavity model, a three-dimensional face expression model corresponding to the user picture.

It may be understood that, the generated three-dimensional face expression model is a result of fusing the three-dimensional face model and the target oral cavity model. That is, sizes and positions of the target oral cavity model and the three-dimensional face model are matched, form expressions are consistent, and lightness is coordinated. In addition, the adjusted three-dimensional face model and the target oral cavity model are rendered to generate the three-dimensional face expression model.

In this embodiment of this application, the three-dimensional face model corresponding to the user picture is obtained, and the selected sample oral cavity model is obtained in the oral cavity model library. Then, the sample oral cavity model is registered into the three-dimensional face model by using the oral cavity position parameter in the three-dimensional face model, and form adjustment is performed on the oral cavity form of the registered sample oral cavity model by using the expression parameter of the three-dimensional face model to generate the target oral cavity model. The three-dimensional face expression model corresponding to the user picture is obtained based on the obtained three-dimensional face model and the generated target oral cavity model. According to the oral cavity position parameter and the expression parameter of the three-dimensional face model, the position and the scale of the sample oral cavity model are configured and the oral cavity shape is adjusted respectively, so that the sample oral cavity model can keep consistent with the three-dimensional face model, the problem of synthesis distortion of the sample oral cavity model and the three-dimensional face model is resolved, and further the synthesis effect of the generated three-dimensional face expression model is good.

Figure 6:
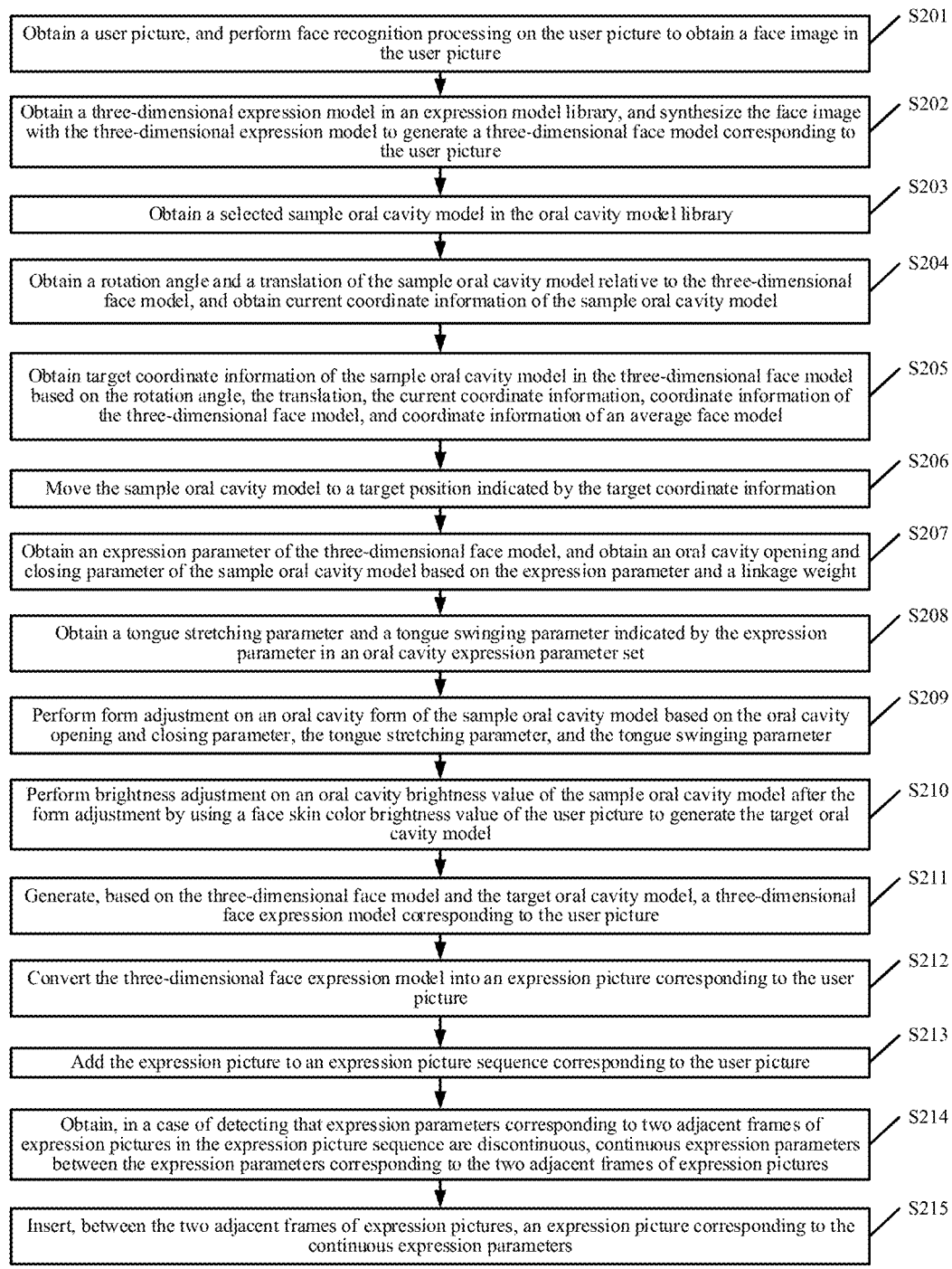
FIG. 6 is a schematic flowchart of a face model processing method according to an embodiment of this application.

FIG. 6 is a schematic flowchart of a face model processing method according to an embodiment of this application. As shown in FIG. 6, the method in this embodiment of this application may include the following step S201 to step S215.

S201. Obtain a user picture, and perform face recognition processing on the user picture to obtain a face image in the user picture.

For description of the user picture, reference may be made to the explanation of the user picture in S101 of the foregoing embodiment. For example, as shown in FIG. 7, a user picture including a face image is obtained.

During specific implementation, an electronic device obtains the user picture, and performs the face recognition processing on the user picture to recognize the face image included in the user picture. The face recognition processing may be performing face detection on the user picture. When the face image is detected, the electronic device may mark the detected face image, perform facial feature positioning or the like. The face detection may be specifically performed according to actual scenario requirements. The face detection process may be implemented by using face recognition methods, such as a face recognition method based on feature face principal component analysis, a face recognition method of elastic graph matching, a face recognition method of a support vector machine, and a face recognition method of a deep neural network.

For description of the electronic device, reference may be made to the explanation of the electronic device in S101 of the foregoing embodiment.

S202. Obtain a three-dimensional expression model in an expression model library, and synthesize the face image with the three-dimensional expression model to generate a three-dimensional face model corresponding to the user picture.

It may be understood that, the expression model library includes at least one expression model. The expression model is a facial feature model with expressions. The obtaining a three-dimensional expression model in an expression model library may be randomly selecting a three-dimensional expression model from an expression model set updated based on a current event, where for example, ten expression models are updated based on a hotspot event occurring on a current date, and the electronic device may randomly select one expression model from the ten expression models to synthesize the three-dimensional face model, or may be obtaining theme information of the user picture after analyzing the user picture or extracting theme information carried in a request, and searching the expression model library for a three-dimensional expression model matching the theme information.

The obtained three-dimensional face model may be described by using a formula $S=\bar{S}+\Sigma w_i U_i+\Sigma v_i V_i$, $S=\bar{S}+\Sigma w_i U_i+\Sigma v_i V_i$. For the three-dimensional face model and description of parameters therein, reference may be made to S101 in the foregoing embodiment.

The obtaining a three-dimensional face model corresponding to the user picture may be understood as obtaining a three-dimensional expression model in an expression model library, and synthesizing the face image with the three-dimensional expression model to generate the three-dimensional face model corresponding to the user picture. For example, FIG. 8 shows a three-dimensional expression model synthesized based on the user picture shown in FIG. 7.

During specific implementation, the three-dimensional expression model is obtained in the expression model library based on the theme information of the user picture or based on the current event. The electronic device synthesizes the recognized face image in the user picture with the obtained three-dimensional expression model to generate the three-dimensional face model corresponding to the user picture.

S203. Obtain a selected sample oral cavity model in the oral cavity model library.

It may be understood that, the oral cavity model library includes at least one oral cavity model, and each oral cavity model may be described by using a formula $T=\overline{T}+\alpha\Delta T_1+\beta\Delta T_2+\gamma\Delta T_3$. For detailed description, reference may be made to the explanation of S101 in the foregoing embodiment.

S204. Obtain an rotation angle and a translation of the sample oral cavity model relative to the three-dimensional face model, and obtain current coordinate information of the sample oral cavity model.

It may be understood that, for description of the rotation angle and the translation, reference may be made to the explanation of S102 in the foregoing embodiment. For the manner of obtaining the rotation angle and the translation of the sample oral cavity model relative to the three-dimensional face model in S204, reference may be made to the obtaining manner of S102 in the foregoing embodiments.

The current coordinate information of the sample oral cavity model is a three-dimensional coordinate value of feature points of the sample oral cavity model in a current coordinate system. Current coordinate information of a prestored sample oral cavity model may be directly obtained in the oral cavity model library.

S205. Obtain target coordinate information of the sample oral cavity model in the three-dimensional face model based on the rotation angle, the translation, the current coordinate information, coordinate information of the three-dimensional face model, and coordinate information of an average face model.

All the coordinate information (such as the coordinate information of the three-dimensional face model, the coordinate information of the average face model, the current coordinate information, and the target coordinate information) is a three-dimensional space coordinate, and is in a one-to-one correspondence with feature points of the model. That is, the coordinate information of each model is a three-dimensional coordinate set of the feature points of the model.

In a specific implementation, as shown in FIG. 9, the obtaining target coordinate information of the sample oral cavity model in the three-dimensional face model based on the rotation angle, the translation, the current coordinate information, coordinate information of the three-dimensional face model, and coordinate information of an average face model may include the following steps:

S301. Obtain an identity feature parameter of the face image in the user picture, and obtain the coordinate information of the three-dimensional face model based on the identity feature parameter, the identity feature base, and the coordinate information of the average face model.

The identity feature parameter $w_i$ of the face image in the user picture may be obtained by analyzing the user picture. In addition, the identity parameter is still unchanged when the expression parameter is 0 in the three-dimensional face model $S=\overline{S}+\Sigma w_i U_i+\Sigma v_i V_i, S=\overline{S}+\Sigma w_i U_i+\Sigma v_i V_i$, and therefore, the obtained identity feature parameter $w_i$, the identity feature base $U_i$, and the coordinate information $\overline{S}$ of the average face model may be substituted into a formula $S=\overline{S}+\Sigma w_i U_i$ to obtain the coordinate information $S$ of the three-dimensional face model.

S302. Calculate a first area of the coordinate information of the three-dimensional face model projected onto a plane and a second area of the coordinate information of the average face model projected onto the plane, and calculate a first ratio of the first area to the second area.

It may be understood that, because the size of the obtained sample oral cavity model does not necessarily completely match a size of the three-dimensional face model, the size of the sample oral cavity model needs to be adjusted according to the size of the three-dimensional face model. For a calculating method of the first ratio, reference may be made to the calculating manner of S102 in the foregoing embodiment.

S303. Obtain the target coordinate information of the sample oral cavity model in the three-dimensional face model based on the first ratio, the rotation angle, the translation, and the current coordinate information.

During specific implementation, the electronic device substitutes the obtained rotation angle R, the current coordinate information T of the sample oral cavity model, the translation t, and the first ratio $$\frac{\text{Area }(\pi(S))}{\text{Area }(\pi(\overline{S}))}$$

into a formula $$T^* = \frac{\text{Area }(\pi(S))}{\text{Area }(\pi(\overline{S}))} \cdot R \cdot T + t,$$

to obtain the coordinate information T* of the sample oral cavity model after the adjustment of the size and the position. T* is the target coordinate information of the sample oral cavity model in the three-dimensional face model.

S206. Move the sample oral cavity model to a target position indicated by the target coordinate information.

Figure 10:
FIG. 10 is a schematic diagram of an effect obtained after a sample oral cavity model is registered according to an embodiment of this application.

The transformation process from T to T* implements the fusion of the sample oral cavity model and the three-dimensional face model. For example, FIG. 10 is a diagram of an effect obtained after the sample oral cavity model is configured to the three-dimensional face model shown in FIG. 8.

S207. Obtain the expression parameter of the three-dimensional face model, and obtain an oral cavity opening and closing parameter of the sample oral cavity model based on the expression parameter and a linkage weight.

For description of the oral cavity opening and closing parameter and the linkage weight, reference may be made to S103 in the foregoing embodiment.

Figure 11:
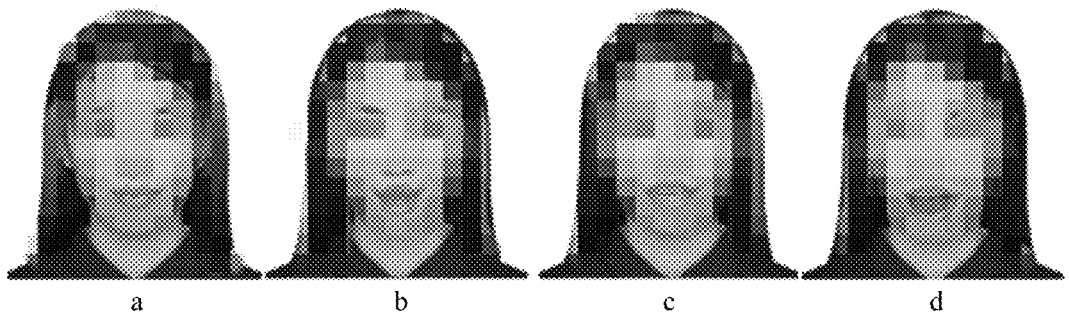
FIG. 11 is a schematic diagram of effects of oral cavity opening and closing degrees in different opening and closing parameter conditions according to an embodiment of this application.

For example, a to d in FIG. 11 respectively describe an opening and closing degree of the registered sample oral cavity model with different α values.

S208. Obtain a tongue stretching parameter and a tongue swinging parameter indicated by the expression parameter in an oral cavity expression parameter set.

The tongue stretching parameter β is used for controlling a stretching degree of a tongue, and the tongue swinging parameter γ is used for controlling a left-right swinging degree of the tongue. For an obtaining manner of the tongue stretching parameter β and the tongue swinging parameter γ, reference may be made to S103 in the foregoing embodiment.

S209. Perform form adjustment on the oral cavity form of the sample oral cavity model based on the oral cavity opening and closing parameter, the tongue stretching parameter, and the tongue swinging parameter.

It may be understood that, because the three-dimensional face model and the sample oral cavity model have respective action mechanisms when the expression changes, and are independent of each other, it is difficult to ensure that the oral cavity form of the sample oral cavity model matches the form of the three-dimensional face model. To ensure coordination between the sample oral cavity model and the three-dimensional face model, the oral cavity form of the sample oral cavity model needs to be adjusted. That is, the oral cavity form of the sample oral cavity model registered into the three-dimensional face model is adjusted.

Specifically, if the registered sample oral cavity model $T^*=\bar{T}+\alpha 1\Delta T_1+\beta 1\Delta T_2+\gamma 1\Delta T_3 T^*=\bar{T}+\alpha 1\Delta T_1+\beta 1\Delta T_2+\gamma 1\Delta T_2$, the oral cavity opening and closing parameter α2 obtained in S207 and the tongue stretching parameter β2 and the tongue swinging parameter γ2 obtained in S208 replace α1, β1, and γ1, so as to adjust the oral cavity form of the sample oral cavity model.

S210. Perform lightness adjustment on an oral cavity lightness value of the sample oral cavity model after the form adjustment by using a face skin color lightness value of the user picture to generate the target oral cavity model.

It may be understood that, the lightness values of the exposed oral cavity model in different environments are different. For example, when the light is relatively dark, a facial skin color of the face model is usually quite dark. If the lightness of the oral cavity model is not adjusted but directly rendered, the displayed oral cavity model is quite bright but uncoordinated. Therefore, when the face skin color lightness value does not match the oral cavity lightness value (for example, a difference between the face skin color lightness value and the oral cavity lightness value exceeds a specified threshold range), lightness adjustment is performed on the oral cavity lightness value of the sample oral cavity model after the form adjustment by using the face skin color lightness value of the user picture.

Figure 12:
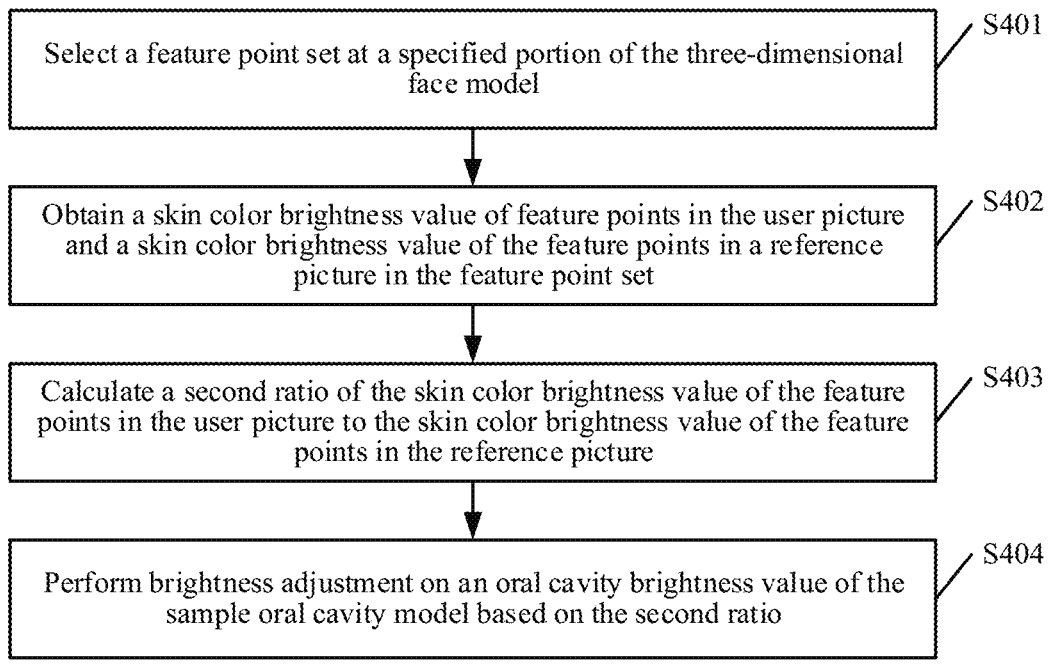
FIG. 12 is a schematic flowchart of a face model processing method according to an embodiment of this application.

In a specific implementation, as shown in FIG. 12, the performing lightness adjustment on an oral cavity lightness value of the sample oral cavity model after the form adjustment by using a face skin color lightness value of the user picture may include the following steps:

S401. Select a feature point set at a specified portion of the three-dimensional face model.

Figure 13:
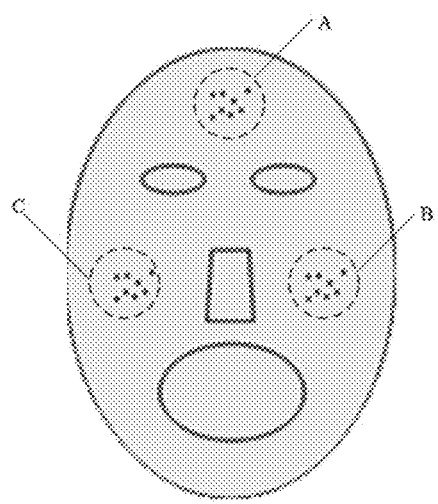
FIG. 13 is a schematic diagram of an interface of feature point selection positions according to an embodiment of this application.

It may be understood that, the specified portion may be a face forehead and a cheek of the three-dimensional face model. At least one feature point is randomly selected at the specified portion respectively. The at least one feature point may include a vertex. FIG. 13 shows a face image of the three-dimensional face model, where A, B and C are the selected feature point set.

S402. Obtain a skin color lightness value of feature points in the user picture and a skin color lightness value of the feature points in a reference picture in the feature point set.

For example, if an A set includes ten feature points A1 to A10, a B set includes ten feature points B1 to B10, and a C set includes ten feature points C1 to C10, a skin color (skin color texture) lightness value $l^*_p$ of 30 feature points at a corresponding position of the user picture is obtained, and linear weighting is performed on the obtained skin color lightness value to obtain $\Sigma_{p\in H}l^*_p\Sigma_{p\in H}l^*_p$. $l^*_p$ is a lightness value of the skin color texture at a p position of the user picture, and H includes A, B and C. Similarly, the skin color (skin color texture) lightness value $l_p$ of the 30 feature points at the corresponding position is obtained in the reference picture (any user picture including a face image in a normal lightness situation) selected by a user, and the linear weighting is performed on the obtained skin color lightness value to obtain $\Sigma_{p\in H}l_p$, $l_p$ is texture lightness at a p position of the reference picture, and H includes A, B and C.

S403. Calculate a second ratio of the skin color lightness value of the feature points in the user picture to the skin color lightness value of the feature points in the reference picture.

Specifically, the second ratio $$S_{tooth\_light} = \frac{\Sigma_{p\in H}l^*_p}{\Sigma_{p\in H}l_p}$$

is calculated based on the skin color lightness value obtained in S402.

The electronic device determines the lightness of the oral cavity texture (as shown in FIG. 5) by calculating the ratio of lightness of a new face to the lightness of the reference face.

S404. Perform lightness adjustment on the oral cavity lightness value of the sample oral cavity model based on the second ratio.

Figure 14:
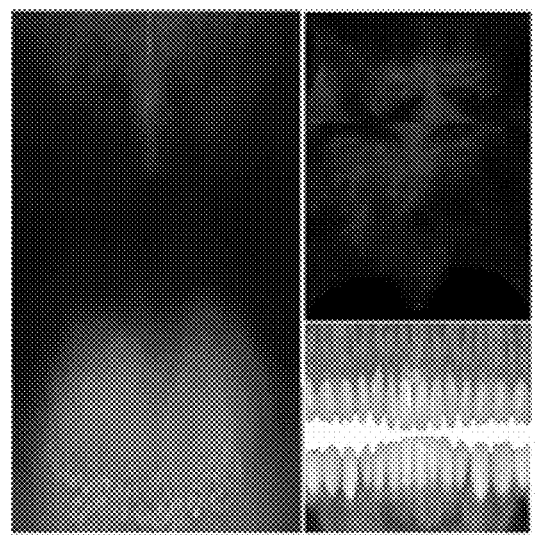
FIG. 14 is a schematic diagram of an interface of an internal texture of an oral cavity model according to an embodiment of this application.

Specifically, after the oral cavity texture of the sample oral cavity model is converted from an RGB space to an HSL space, the electronic device scales on the oral cavity lightness value of the oral cavity texture at an equal proportion by using the second ratio $s_{tooth\_light}$, and finally, converts the oral cavity lightness value to the RGB space for display. An oral cavity texture image (each portion of the oral cavity) is shown in FIG. 14. The lightness value of the feature points of the oral cavity texture image in FIG. 14 is adjusted based on $s_{tooth\_light}$ obtained through calculation.

S211. Generate, based on the three-dimensional face model and the target oral cavity model, a three-dimensional face expression model corresponding to the user picture.

It may be understood that, the generated three-dimensional face expression model is a result of fusing the three-dimensional face model and the target oral cavity model. That is, sizes and positions of the target oral cavity model and the three-dimensional face model are matched, form expressions are consistent, and lightness is coordinated. In addition, the adjusted three-dimensional face model and the target oral cavity model are rendered to generate the three-dimensional face expression model.

In a specific implementation scenario, this embodiment of this application may further include the following steps.

S212. Convert the three-dimensional face expression model into an expression picture corresponding to the user picture.

It may be understood that, the three-dimensional face expression model is a three-dimensional image, and the expression picture is a two-dimensional image. The conversion from three-dimensional face expression model to the expression picture is only conversion of a space dimension, and picture content is unchanged.

S213. Add the expression picture to an expression picture sequence corresponding to the user picture.

It may be understood that, the expression picture sequence may be formed by a plurality of frames of expression pictures. The expression picture sequence is a dynamic expression picture (for example, a GIF format picture) displayed according to a specified display sequence and a time interval. The adding the expression picture to an expression picture sequence corresponding to the user picture may be understood as creating an empty expression picture sequence, and then the obtained plurality of frames of expression pictures are added to the empty expression picture sequence. It may further be understood that, an empty expression picture sequence is created, the time interval is set, and each time a frame of expression picture is generated, the frame of expression picture is added to the empty expression picture sequence.

S214. Obtain, in a case of detecting that expression parameters corresponding to two adjacent frames of expression pictures in the expression picture sequence are discontinuous, continuous expression parameters between the expression parameters corresponding to the two adjacent frames of expression pictures.

It may be understood that, each frame of expression picture in the expression picture sequence corresponds to one expression parameter respectively, and the expression parameters of the two adjacent frames of expression pictures are continuous, so that when the expression picture sequence is displayed, the user may watch the expression picture sequence in which a set of expressions continuously change, which is interesting. The face images corresponding to each frame of expression picture may be completely the same, or may be completely different, or may be partially the same, which is not specifically limited.

During specific implementation, the electronic device traverses each frame of expression picture, and reads a first expression parameter of the traversed current expression picture and a second expression parameter of a next frame of expression picture. If the first expression parameter and the second expression parameter are continuous, the electronic device continuously reads a third expression parameter of a next frame of expression picture, and determines whether the second expression parameter and the third expression parameter are continuous. If the first expression parameter and the second expression parameter are discontinuous, the electronic device obtains continuous expression parameters between the first expression parameter and the second expression parameter, and searches the picture library for an expression picture corresponding to the continuous expression parameters or generates an expression picture corresponding to the continuous expression parameters by using the foregoing manner. There is at least one continuous expression parameter. That is, at least one frame of expression picture needs to be inserted between two frames of discontinuous expression pictures, so that the discontinuous expression pictures become continuous expression pictures.

S215. Insert, between the two adjacent frames of expression pictures, an expression picture corresponding to the continuous expression parameters.

Specifically, the electronic device inserts the expression picture corresponding to the obtained continuous expression parameters between the two frames of discontinuous expression pictures, so that expressions continuously change.

Usually, a relatively large quantity of expression pictures need to be obtained to generate the expression picture sequence in which the expressions continuously change. However, in order to reduce a calculation amount, the expression pictures with a specified quantity of frames may be first obtained, and then is supplemented by means of inserting the frames (inserting the expression pictures).

In this embodiment of this application, the three-dimensional face model corresponding to the user picture is obtained, and the selected sample oral cavity model is obtained in the oral cavity model library. Then, the sample oral cavity model is registered into the three-dimensional face model by using the oral cavity position parameter in the three-dimensional face model, and form adjustment is performed on the oral cavity form of the registered sample oral cavity model by using the expression parameter of the three-dimensional face model to generate the target oral cavity model. The three-dimensional face expression model corresponding to the user picture is obtained based on the obtained three-dimensional face model and the generated target oral cavity model. According to the oral cavity position parameter and the expression parameter of the three-dimensional face model, the position and the scale of the sample oral cavity model are configured and the oral cavity form is adjusted respectively, so that the sample oral cavity model can keep consistent with the three-dimensional face model, the problem of synthesis distortion of the sample oral cavity model and the three-dimensional face model is resolved, and further the synthesis effect of the generated three-dimensional face expression model is good.

It may be understood that, although the steps in the flowcharts of FIG. 1b, FIG. 6, FIG. 9 and FIG. 12 are sequentially shown according to indication of arrows, the steps are not necessarily performed sequentially according to the sequence indicated by the arrows. Unless clearly specified in this specification, execution of the steps is not strictly limited, and the steps may be performed in other sequences. Moreover, at least some of the steps in FIG. 1b, FIG. 6, FIG. 9 and FIG. 12 may include a plurality of substeps or a plurality of stages. The substeps or the stages are not necessarily performed at the same moment, but may be performed at different moments. The substeps or the stages are not necessarily executed sequentially, but may be performed sequentially or alternately with other steps or at least some of the substeps or stages of other steps.

The following describes the face model processing apparatus provided in the embodiments of this application in detail with reference to FIG. 15 to FIG. 20. The apparatus shown in FIG. 15 to FIG. 20 are configured to perform the methods in the embodiments shown in FIG. 1 to FIG. 14 of this application. For ease of description, only a part related to the embodiments of this application is shown. For specific technical details that are not disclosed, refer to the embodiments shown in FIG. 1 to FIG. 14 of this application.

Figure 15:
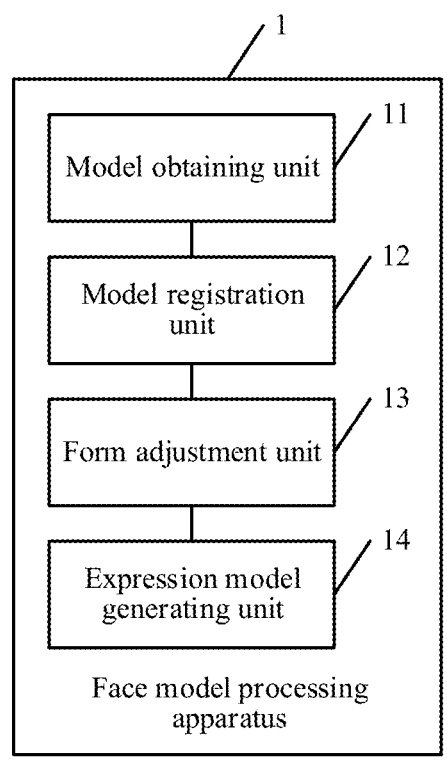
FIG. 15 is a schematic structural diagram of a face model processing apparatus according to an embodiment of this application.

FIG. 15 is a schematic structural diagram of a face model processing apparatus according to an embodiment of this application. As shown in FIG. 15, the face model processing apparatus 1 in this embodiment of this application may include: a model obtaining unit 11, a model registration unit 12, a form adjustment unit 13, and an expression model generating unit 14.

The model obtaining unit 11 is configured to obtain a three-dimensional face model corresponding to a user picture, and obtain a selected sample oral cavity model in an oral cavity model library.

The model registration unit 12 is configured to register the sample oral cavity model into the three-dimensional face model by using an oral cavity position parameter in the three-dimensional face model.

In a specific implementation, the model registration unit 12 is configured to: obtain an rotation angle and a translation of the sample oral cavity model relative to the three-dimensional face model, and obtain current coordinate information of the sample oral cavity model; obtain target coordinate information of the sample oral cavity model in the three-dimensional face model based on the rotation angle, the translation, the current coordinate information, coordinate information of the three-dimensional face model, and coordinate information of an average face model; and move the sample oral cavity model to a target position indicated by the target coordinate information.

The form adjustment unit 13 is configured to perform form adjustment on an oral cavity form of the registered sample oral cavity model by using an expression parameter of the three-dimensional face model to generate a target oral cavity model.

The expression model generating unit 14 is configured to generate, based on the three-dimensional face model and the target oral cavity model, a three-dimensional face expression model corresponding to the user picture.

For description of terms and manners such as the user picture, the oral cavity position parameter, the rotation angle, the three-dimensional face model, the sample oral cavity model, and the adjustment manner of oral cavity lightness, reference may be made to the content in the foregoing face model processing method embodiments.

In this embodiment of this application, the three-dimensional face model corresponding to the user picture is obtained, and the selected sample oral cavity model is obtained in the oral cavity model library. Then, the sample oral cavity model is registered into the three-dimensional face model by using the oral cavity position parameter in the three-dimensional face model, and form adjustment is performed on the oral cavity form of the registered sample oral cavity model by using the expression parameter of the three-dimensional face model to generate the target oral cavity model. The three-dimensional face expression model corresponding to the user picture is obtained based on the obtained three-dimensional face model and the generated target oral cavity model. According to the oral cavity position parameter and the expression parameter of the three-dimensional face model, the position and the scale of the sample oral cavity model are configured and the oral cavity form is adjusted respectively, so that the sample oral cavity model can keep consistent with the three-dimensional face model, the problem of synthesis distortion of the sample oral cavity model and the three-dimensional face model is resolved, and further the synthesis effect of the generated three-dimensional face expression model is good.

Figure 16:
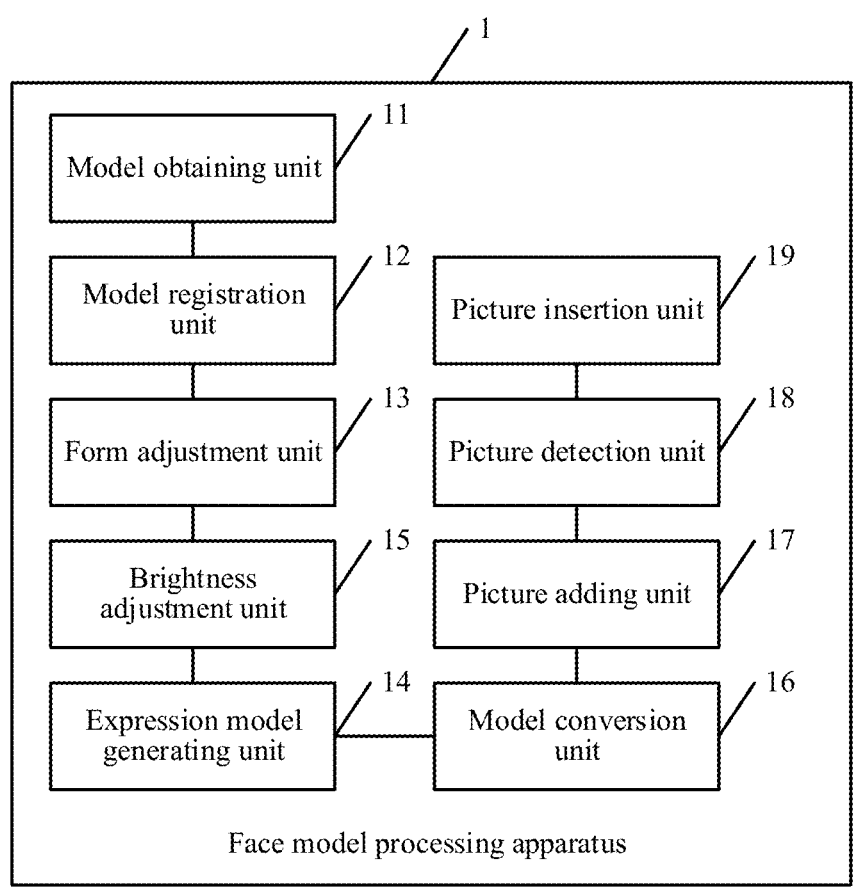
FIG. 16 is a schematic structural diagram of a face model processing apparatus according to an embodiment of this application.

FIG. 16 is a schematic structural diagram of a face model processing apparatus according to an embodiment of this application. As shown in FIG. 16, the face model processing apparatus 1 in this embodiment of this application may include: a model obtaining unit 11, a model registration unit 12, a form adjustment unit 13, an expression model generating unit 14, a lightness adjustment unit 15, a model conversion unit 16, a picture adding unit 17, a picture detection unit 18, and a picture insertion unit 19.

The model obtaining unit 11 is configured to obtain a three-dimensional face model corresponding to a user picture, and obtain a selected sample oral cavity model in an oral cavity model library.

Figure 17:
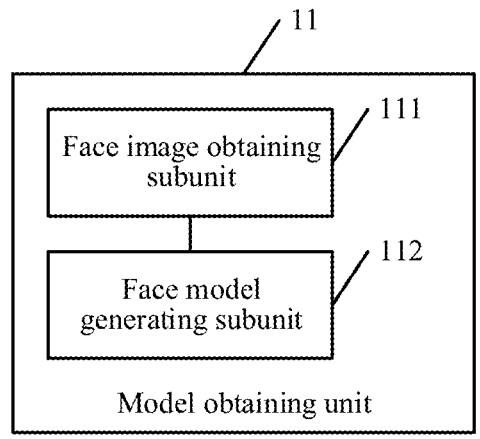
FIG. 17 is a schematic structural diagram of a model obtaining unit according to an embodiment of this application.

Optionally, as shown in FIG. 17, the model obtaining unit 11 includes:

a face image obtaining subunit 111, configured to obtain a selected user picture, and perform face recognition processing on the user picture to obtain a face image in the user picture; and a face model generating subunit 112, configured to obtain a three-dimensional expression model in an expression model library, and synthesize the face image with the three-dimensional expression model to generate the three-dimensional face model corresponding to the user picture.

During specific implementation, the face model generating subunit 112 is configured to: obtain a three-dimensional expression model in an expression model library based on theme information of the user picture or based on a current event, and synthesize the recognized face image in the user picture with the obtained three-dimensional expression model to generate the three-dimensional face model corresponding to the user picture.

The model registration unit 12 is configured to register the sample oral cavity model into the three-dimensional face model by using an oral cavity position parameter in the three-dimensional face model.

Figure 18:
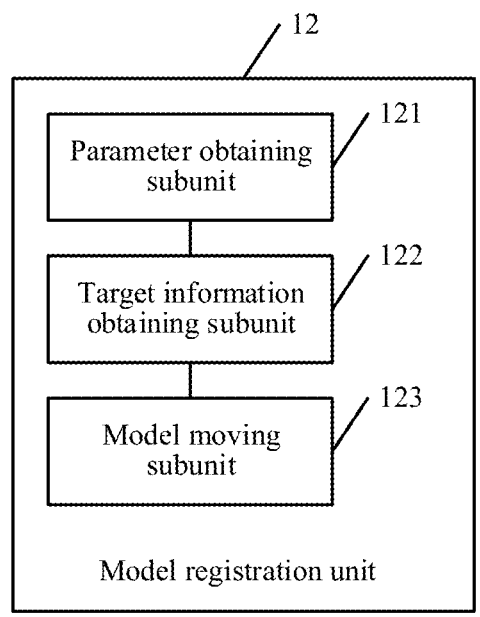
FIG. 18 is a schematic structural diagram of a model registration unit according to an embodiment of this application.

Optionally, as shown in FIG. 18, the model registration unit 12 includes:

a parameter obtaining subunit 121, configured to obtain an rotation angle and a translation of the sample oral cavity model relative to the three-dimensional face model, and obtain current coordinate information of the sample oral cavity model, where the current coordinate information of the sample oral cavity model is a three-dimensional coordinate value of feature points of the sample oral cavity model in a current coordinate system, and current coordinate information of a prestored sample oral cavity model may be directly obtained in the oral cavity model library;

a target information obtaining subunit 122, configured to obtain target coordinate information of the sample oral cavity model in the three-dimensional face model based on the rotation angle, the translation, the current coordinate information, coordinate information of the three-dimensional face model, and coordinate information of an average face model; and a model moving subunit 123, configured to move the sample oral cavity model to a target position indicated by the target coordinate information.

Optionally, the target information obtaining subunit 122 is specifically configured to:

obtain an identity feature parameter of a face image in the user picture, and obtain the coordinate information of the three-dimensional face model based on the identity feature parameter, an identity feature base, and the coordinate information of the average face model;

calculate a first area of the coordinate information of the three-dimensional face model projected onto a plane and a second area of the coordinate information of the average face model projected onto the plane, and calculate a first ratio of the first area to the second area; and obtain the target coordinate information of the sample oral cavity model in the three-dimensional face model based on the first ratio, the rotation angle, the translation, and the current coordinate information.

The form adjustment unit 13 is configured to perform form adjustment on an oral cavity form of the registered sample oral cavity model by using an expression parameter of the three-dimensional face model to generate a target oral cavity model.

Figure 19:
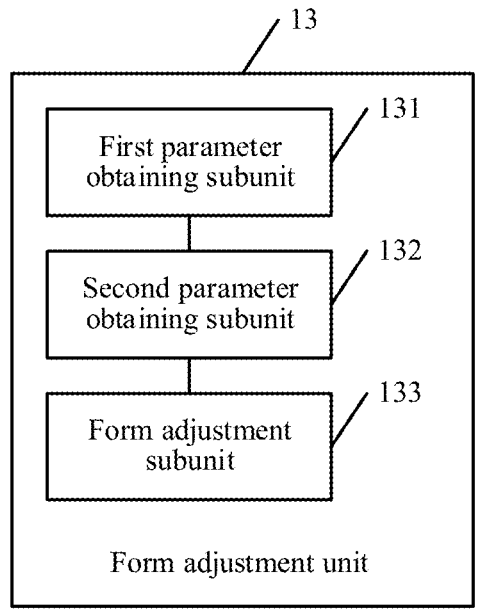
FIG. 19 is a schematic structural diagram of a form adjustment unit according to an embodiment of this application.

Optionally, as shown in FIG. 19, the form adjustment unit 13 includes:

a first parameter obtaining subunit 131, configured to obtain the expression parameter of the three-dimensional face model, and obtain an oral cavity opening and closing parameter of the sample oral cavity model based on the expression parameter and a linkage weight;

a second parameter obtaining subunit 132, configured to obtain a tongue stretching parameter and a tongue swinging parameter indicated by the expression parameter in an oral cavity expression parameter set; and a form adjustment subunit 133, configured to perform form adjustment on the oral cavity form of the sample oral cavity model based on the oral cavity opening and closing parameter, the tongue stretching parameter, and the tongue swinging parameter.

The lightness adjustment unit 15 is configured to perform lightness adjustment on an oral cavity lightness value of the sample oral cavity model after the form adjustment by using a face skin color lightness value of the user picture.

Figure 20:
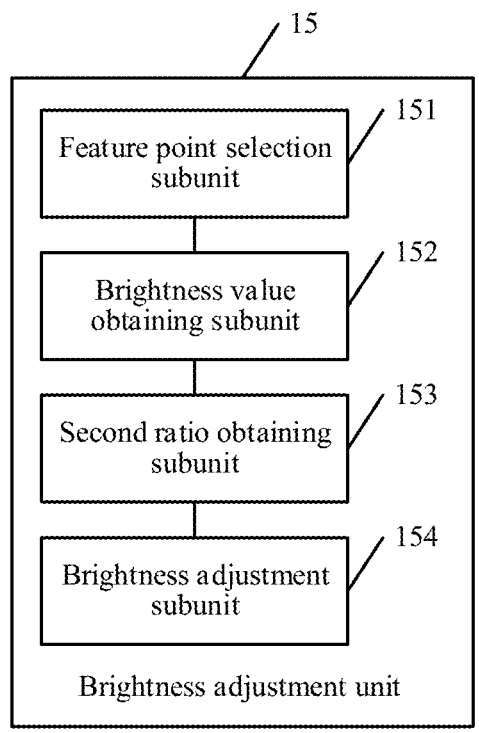
FIG. 20 is a schematic structural diagram of a lightness adjustment unit according to an embodiment of this application.

Optionally, as shown in FIG. 20, the lightness adjustment unit 15 includes:

a feature point selection subunit 151, configured to select a feature point set at a specified portion of the three-dimensional face model;

a lightness value obtaining subunit 152, configured to obtain a skin color lightness value of feature points in the user picture and a skin color lightness value of the feature points in a reference picture in the feature point set;

a second ratio obtaining subunit 153, configured to calculate a second ratio of the skin color lightness value of the feature points in the user picture to the skin color lightness value of the feature points in the reference picture; and a lightness adjustment subunit 154, configured to perform lightness adjustment on the oral cavity lightness value of the sample oral cavity model based on the second ratio.

The expression model generating unit 14 is configured to generate, based on the three-dimensional face model and the target oral cavity model, a three-dimensional face expression model corresponding to the user picture.

The model conversion unit 16 is configured to convert the three-dimensional face expression model into an expression picture corresponding to the user picture.

The picture adding unit 17 is configured to add the expression picture to an expression picture sequence corresponding to the user picture.

The picture detection unit 18 is configured to obtain, in a case of detecting that expression parameters corresponding to two adjacent frames of expression pictures in the expression picture sequence are discontinuous, continuous expression parameters between the expression parameters corresponding to the two adjacent frames of expression pictures.

The picture insertion unit 19 is configured to insert, between the two adjacent frames of expression pictures, an expression picture corresponding to the continuous expression parameters.

Specifically, the expression picture corresponding to the obtained continuous expression parameters is inserted between two frames of discontinuous expression pictures, so that expressions continuously change.

For terms and manners such as the three-dimensional face model, the user picture, the expression model library, the oral cavity position parameters, the rotation angles, the translation, the coordinate information, the calculating manner of the first ratio, the sample oral cavity model, and the adjustment manner of the oral cavity form, reference may be made to the content in the foregoing face model processing method embodiments.

In this embodiment of this application, the three-dimensional face model corresponding to the user picture is obtained, and the selected sample oral cavity model is obtained in the oral cavity model library. Then, the sample oral cavity model is registered into the three-dimensional face model by using the oral cavity position parameter in the three-dimensional face model, and form adjustment is performed on the oral cavity form of the registered sample oral cavity model by using the expression parameter of the three-dimensional face model to generate the target oral cavity model. The three-dimensional face expression model corresponding to the user picture is obtained based on the obtained three-dimensional face model and the generated target oral cavity model. According to the oral cavity position parameter and the expression parameter of the three-dimensional face model, the position and the scale of the sample oral cavity model are configured and the oral cavity form is adjusted respectively, so that the sample oral cavity model can keep consistent with the three-dimensional face model, the problem of synthesis distortion of the sample oral cavity model and the three-dimensional face model is resolved, and further the synthesis effect of the generated three-dimensional face expression model is good.

An embodiment of this application further provides a non-volatile computer-readable storage medium. The non-volatile computer-readable storage medium may store a plurality of instructions. The instructions are configured to be loaded and executed by a processor to perform the steps of the face model processing method in the embodiments shown in FIG. 1 to FIG. 14. For a specific execution process, reference may be made to the specific description of the embodiments shown in FIG. 1 to FIG. 14.

Figure 21:
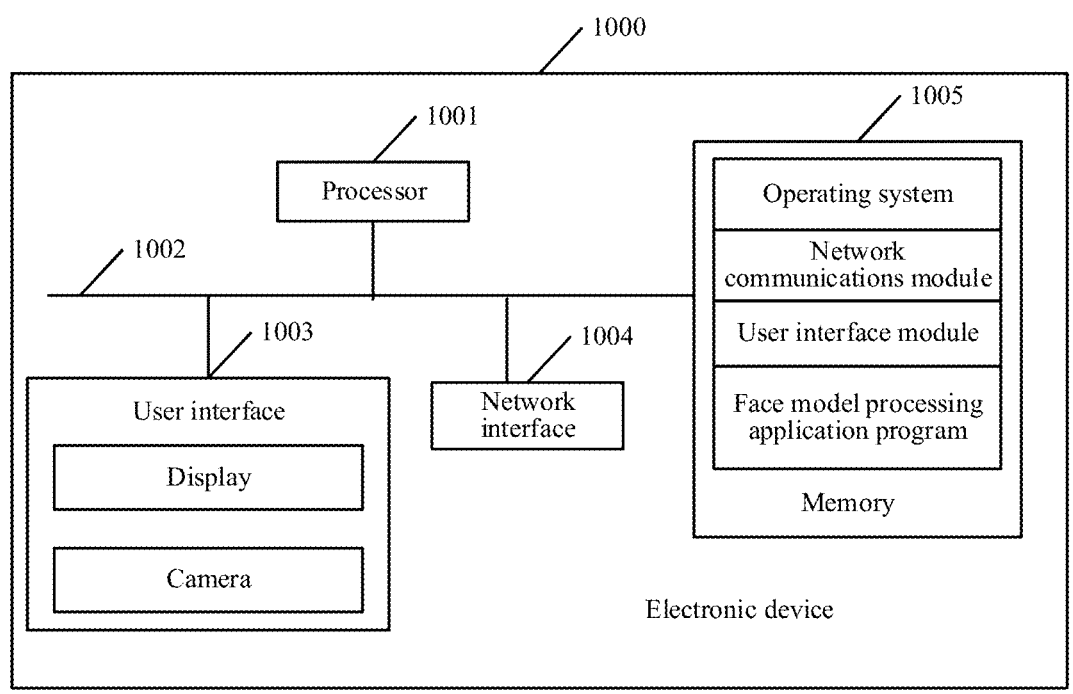
FIG. 21 is a schematic structural diagram of a server according to an embodiment of this application.

FIG. 21 is a schematic structural diagram of an electronic device according to an embodiment of this application. As shown in FIG. 21, the electronic device 1000 may include: at least one processor 1001 such as a central processing unit (CPU), at least one network interface 1004, a user interface 1003, a memory 1005, and at least one communications bus 1002. The communications bus 1002 is configured to implement connection and communication between the components. The user interface 1003 may include a display and a camera. Optionally, the user interface 1003 may further include a standard wired interface and wireless interface. Optionally, the network interface 1004 may include a standard wired interface and wireless interface (for example, a Wi-Fi interface). The memory 1005 may be a high-speed RAM memory, or may be a non-volatile memory, for example, at least one magnetic disk memory. Optionally, the memory 1005 may further be at least one storage apparatus that is located far away from the processor 1001. As shown in FIG. 21, the memory 1005, as a non-volatile computer-readable storage medium, may include an operating system, a network communications module, a user interface module, and a face model processing application program.

In the electronic device 1000 shown in FIG. 21, the user interface 1003 is mainly configured to provide a user with an input interface and obtain data inputted by the user. The processor 1001 may be configured to invoke a computer program stored in the memory 1005 for face model processing. The computer program, when executed by the processor, causes the processor to perform the steps of the face model processing method in any of the foregoing embodiments.

A person of ordinary skill in the art may understand that all or some of the processes in the method of the foregoing embodiments may be implemented by using the computer program to instruct related hardware. The program may be stored in a non-volatile computer-readable storage medium. When the program is executed, the processes of the foregoing method embodiments may be performed. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct rambus dynamic RAM (DRDRAM), and a rambus dynamic RAM (RDRAM).

The foregoing disclosure is merely exemplary embodiments of this application, and certainly is not intended to limit the protection scope of this application. Therefore, equivalent variations made in accordance with the claims of this application shall fall within the scope of this application.

What is claimed is:

1. A face model processing method, executed by an electronic device having a processor and memory storing a plurality of programs to be executed by the processor, the method comprising:
    obtaining a three-dimensional face model corresponding to a user picture, and selecting a sample oral cavity model from a pre-existing oral cavity model library for the three-dimensional face model, the three-dimensional face model including an oral cavity position parameter, an expression parameter and a linkage weight associated with the expression parameter;
    registering the sample oral cavity model into the three-dimensional face model by using the oral cavity position parameter in the three-dimensional face model;
    performing form adjustment on an oral cavity form of the registered sample oral cavity model by using the expression parameter and the linkage weight of the three-dimensional face model to generate a target oral cavity model; and
    generating, based on the three-dimensional face model and the target oral cavity model, a three-dimensional face expression model corresponding to the user picture.

2. The method according to claim 1, wherein the obtaining a three-dimensional face model corresponding to a user picture comprises:
    obtaining the user picture, and performing face recognition processing on the user picture to obtain a face image in the user picture; and
    obtaining a three-dimensional expression model in an expression model library, and synthesizing the face image with the three-dimensional expression model to generate the three-dimensional face model corresponding to the user picture.

3. The method according to claim 1, wherein the registering the sample oral cavity model into the three-dimensional face model by using an oral cavity position parameter in the three-dimensional face model comprises:
    obtaining a rotation angle and a translation of the sample oral cavity model relative to the three-dimensional face model, and obtaining current coordinate information of the sample oral cavity model;
    obtaining target coordinate information of the sample oral cavity model in the three-dimensional face model based on the rotation angle, the translation, the current coordinate information, coordinate information of the three-dimensional face model, and coordinate information of an average face model; and
    moving the sample oral cavity model to a target position indicated by the target coordinate information.

4. The method according to claim 3, wherein the obtaining target coordinate information of the sample oral cavity model in the three-dimensional face model based on the rotation angle, the translation, the current coordinate information, coordinate information of the three-dimensional face model, and coordinate information of an average face model comprises:
    obtaining an identity feature parameter of a face image in the user picture, and obtaining the coordinate information of the three-dimensional face model based on the identity feature parameter, an identity feature base, and the coordinate information of the average face model;
    calculating a first area of the coordinate information of the three-dimensional face model projected onto a plane, calculating a second area of the coordinate information of the average face model projected onto the plane, and calculating a first ratio of the first area to the second area; and
    obtaining the target coordinate information of the sample oral cavity model in the three-dimensional face model based on the first ratio, the rotation angle, the translation, and the current coordinate information.

5. The method according to claim 1, wherein the performing form adjustment on an oral cavity form of the registered sample oral cavity model by using an expression parameter of the three-dimensional face model comprises:
    obtaining the expression parameter of the three-dimensional face model, and obtaining an oral cavity opening and closing parameter of the sample oral cavity model based on the expression parameter and the linkage weight;
    obtaining a tongue stretching parameter and a tongue swinging parameter indicated by the expression parameter in an oral cavity expression parameter set; and
    performing form adjustment on the oral cavity form of the sample oral cavity model based on the oral cavity opening and closing parameter, the tongue stretching parameter, and the tongue swinging parameter.

6. The method according to claim 1, wherein after the performing form adjustment on an oral cavity form of the registered sample oral cavity model by using an expression parameter of the three-dimensional face model, the method further comprises:
    performing lightness adjustment on an oral cavity lightness value of the sample oral cavity model after the form adjustment by using a face skin color lightness value of the user picture.

7. The method according to claim 6, wherein the performing lightness adjustment on an oral cavity lightness value of the sample oral cavity model after the form adjustment by using a face skin color lightness value of the user picture comprises:
    selecting a feature point set at a specified portion of the three-dimensional face model;

obtaining a skin color lightness value of feature points in the user picture and a skin color lightness value of the feature points in a reference picture in the feature point set;

calculating a second ratio of the skin color lightness value of the feature points in the user picture to the skin color lightness value of the feature points in the reference picture; and performing lightness adjustment on the oral cavity lightness value of the sample oral cavity model based on the second ratio.

8. The method according to claim 1, wherein after the generating, based on the three-dimensional face model and the target oral cavity model, a three-dimensional face expression model corresponding to the user picture, the method further comprises:

converting the three-dimensional face expression model into an expression picture corresponding to the user picture;

adding the expression picture to an expression picture sequence corresponding to the user picture;

obtaining, in a case of detecting that expression parameters corresponding to two adjacent frames of expression pictures in the expression picture sequence are discontinuous, continuous expression parameters between the expression parameters corresponding to the two adjacent frames of expression pictures; and inserting, between the two adjacent frames of expression pictures, an expression picture corresponding to the continuous expression parameters.

9. An electronic device, comprising a processor and a memory, the memory storing a plurality of computer programs, the computer programs, when executed by the processor, causing the electronic device to perform a plurality of operations including:

obtaining a three-dimensional face model corresponding to a user picture, and selecting a sample oral cavity model from a pre-existing oral cavity model library for the three-dimensional face model, the three-dimensional face model including an oral cavity position parameter, an expression parameter and a linkage weight associated with the expression parameter;

registering the sample oral cavity model into the three-dimensional face model by using the oral cavity position parameter in the three-dimensional face model;

performing form adjustment on an oral cavity form of the registered sample oral cavity model by using the expression parameter and the linkage weight of the three-dimensional face model to generate a target oral cavity model; and generating, based on the three-dimensional face model and the target oral cavity model, a three-dimensional face expression model corresponding to the user picture.

10. The electronic device according to claim 9, wherein the obtaining a three-dimensional face model corresponding to a user picture comprises:

obtaining the user picture, and performing face recognition processing on the user picture to obtain a face image in the user picture; and obtaining a three-dimensional expression model in an expression model library, and synthesizing the face image with the three-dimensional expression model to generate the three-dimensional face model corresponding to the user picture.

11. The electronic device according to claim 9, wherein the registering the sample oral cavity model into the three-dimensional face model by using an oral cavity position parameter in the three-dimensional face model comprises:

obtaining a rotation angle and a translation of the sample oral cavity model relative to the three-dimensional face model, and obtaining current coordinate information of the sample oral cavity model;

obtaining target coordinate information of the sample oral cavity model in the three-dimensional face model based on the rotation angle, the translation, the current coordinate information, coordinate information of the three-dimensional face model, and coordinate information of an average face model; and moving the sample oral cavity model to a target position indicated by the target coordinate information.

12. The electronic device according to claim 11, wherein the obtaining target coordinate information of the sample oral cavity model in the three-dimensional face model based on the rotation angle, the translation, the current coordinate information, coordinate information of the three-dimensional face model, and coordinate information of an average face model comprises:

obtaining an identity feature parameter of a face image in the user picture, and obtaining the coordinate information of the three-dimensional face model based on the identity feature parameter, an identity feature base, and the coordinate information of the average face model;

calculating a first area of the coordinate information of the three-dimensional face model projected onto a plane, calculating a second area of the coordinate information of the average face model projected onto the plane, and calculating a first ratio of the first area to the second area; and obtaining the target coordinate information of the sample oral cavity model in the three-dimensional face model based on the first ratio, the rotation angle, the translation, and the current coordinate information.

13. The electronic device according to claim 9, wherein the performing form adjustment on an oral cavity form of the registered sample oral cavity model by using an expression parameter of the three-dimensional face model comprises:

obtaining the expression parameter of the three-dimensional face model, and obtaining an oral cavity opening and closing parameter of the sample oral cavity model based on the expression parameter and the linkage weight;

obtaining a tongue stretching parameter and a tongue swinging parameter indicated by the expression parameter in an oral cavity expression parameter set; and performing form adjustment on the oral cavity form of the sample oral cavity model based on the oral cavity opening and closing parameter, the tongue stretching parameter, and the tongue swinging parameter.

14. The electronic device according to claim 9, wherein after the performing form adjustment on an oral cavity form of the registered sample oral cavity model by using an expression parameter of the three-dimensional face model, the method further comprises:

performing lightness adjustment on an oral cavity lightness value of the sample oral cavity model after the form adjustment by using a face skin color lightness value of the user picture.

15. The electronic device according to claim 14, wherein the performing lightness adjustment on an oral cavity lightness value of the sample oral cavity model after the form adjustment by using a face skin color lightness value of the user picture comprises:

selecting a feature point set at a specified portion of the three-dimensional face model;
obtaining a skin color lightness value of feature points in the user picture and a skin color lightness value of the feature points in a reference picture in the feature point set;
calculating a second ratio of the skin color lightness value of the feature points in the user picture to the skin color lightness value of the feature points in the reference picture; and
performing lightness adjustment on the oral cavity lightness value of the sample oral cavity model based on the second ratio.

16. The electronic device according to claim 9, wherein after the generating, based on the three-dimensional face model and the target oral cavity model, a three-dimensional face expression model corresponding to the user picture, the method further comprises:
converting the three-dimensional face expression model into an expression picture corresponding to the user picture;
adding the expression picture to an expression picture sequence corresponding to the user picture;
obtaining, in a case of detecting that expression parameters corresponding to two adjacent frames of expression pictures in the expression picture sequence are discontinuous, continuous expression parameters between the expression parameters corresponding to the two adjacent frames of expression pictures; and
inserting, between the two adjacent frames of expression pictures, an expression picture corresponding to the continuous expression parameters.

17. A non-transitory computer-readable storage medium storing instructions, the instructions, when executed by a processor of an electronic device, cause the electronic device to perform a plurality of operations including:
obtaining a three-dimensional face model corresponding to a user picture, and selecting a sample oral cavity model from a pre-existing oral cavity model library for the three-dimensional face model, the three-dimensional face model including an oral cavity position parameter, an expression parameter and a linkage weight associated with the expression parameter;
registering the sample oral cavity model into the three-dimensional face model by using the oral cavity position parameter in the three-dimensional face model;
performing form adjustment on an oral cavity form of the registered sample oral cavity model by using the expression parameter and the linkage weight of the three-dimensional face model to generate a target oral cavity model; and
generating, based on the three-dimensional face model and the target oral cavity model, a three-dimensional face expression model corresponding to the user picture.

18. The non-transitory computer-readable storage medium according to claim 17, wherein the obtaining a three-dimensional face model corresponding to a user picture comprises:
obtaining the user picture, and performing face recognition processing on the user picture to obtain a face image in the user picture; and
obtaining a three-dimensional expression model in an expression model library, and synthesizing the face image with the three-dimensional expression model to generate the three-dimensional face model corresponding to the user picture.

19. The non-transitory computer-readable storage medium according to claim 17, wherein the registering the sample oral cavity model into the three-dimensional face model by using an oral cavity position parameter in the three-dimensional face model comprises:
obtaining a rotation angle and a translation of the sample oral cavity model relative to the three-dimensional face model, and obtaining current coordinate information of the sample oral cavity model;
obtaining target coordinate information of the sample oral cavity model in the three-dimensional face model based on the rotation angle, the translation, the current coordinate information, coordinate information of the three-dimensional face model, and coordinate information of an average face model; and
moving the sample oral cavity model to a target position indicated by the target coordinate information.

20. The non-transitory computer-readable storage medium according to claim 17, wherein the performing form adjustment on an oral cavity form of the registered sample oral cavity model by using an expression parameter of the three-dimensional face model comprises:
obtaining the expression parameter of the three-dimensional face model, and obtaining an oral cavity opening and closing parameter of the sample oral cavity model based on the expression parameter and the linkage weight;
obtaining a tongue stretching parameter and a tongue swinging parameter indicated by the expression parameter in an oral cavity expression parameter set; and
performing form adjustment on the oral cavity form of the sample oral cavity model based on the oral cavity opening and closing parameter, the tongue stretching parameter, and the tongue swinging parameter.

* * * * *